United States Patent [19]
Wong

[11] Patent Number: 4,561,503
[45] Date of Patent: Dec. 31, 1985

[54] $H_3PO_4$/HF SILICEOUS FORMATION TREATING COMPOSITION AND METHOD

[75] Inventor: Tony C. T. Wong, Calgary, Canada

[73] Assignee: Amerigo Technology Limited, Calgary, Canada

[21] Appl. No.: 440,262

[22] Filed: Nov. 9, 1982

[30] Foreign Application Priority Data

Nov. 9, 1981 [CA] Canada ................................. 389713

[51] Int. Cl.$^4$ .............................................. E21B 43/27
[52] U.S. Cl. .................. 166/307; 252/8.55 C
[58] Field of Search ...................... 252/8.55 C, 8.55 R; 166/307

[56] References Cited

U.S. PATENT DOCUMENTS

| | | | |
|---|---|---|---|
| 2,094,479 | 9/1937 | Vandergrift | 252/8.55 |
| 2,652,360 | 9/1953 | Bond et al. | 252/8.55 |
| 2,664,398 | 12/1953 | Bond | 252/8.55 |
| 3,794,117 | 2/1974 | Knox et al. | 252/8.55 X |
| 3,953,340 | 4/1976 | Templeton et al. | 252/8.55 |
| 4,304,676 | 12/1981 | Hall | 252/8.55 |
| 4,332,688 | 6/1982 | Tate | 252/8.55 |

FOREIGN PATENT DOCUMENTS 2047305 11/1980 United Kingdom ............... 252/8.55

Primary Examiner—Herbert B. Guynn
Attorney, Agent, or Firm—Sixbey, Friedman & Leedom

[57] ABSTRACT

A composition for treatment of siliceous formations, comprising an aqueous solution having a phosphoric acid concentration in the range of from about 10 to about 30% by weight, to which is added at least one fluorine donor compound in an amount to provide a generated hydrofluoric acid concentration in the range of from about 1 to about 7% by weight. The composition is quite reactive towards clay and silica but, unlike conventional mud acid, displays significantly retarded reactivity towards calcium carbonate. The preferred fluorine donor is ammonium bifluoride, and an especially effective phosphoric acid solution is a Turflo ® solution, components of which serve to further potentiate calcium carbonate reactivity retardation.

32 Claims, No Drawings

$H_3PO_4$/HF SILICEOUS FORMATION TREATING COMPOSITION AND METHOD

FIELD OF THE INVENTION

This invention relates to compositions for treatment of siliceous formations, and the use of such compositions in the treatment of siliceous formations to increase formation permeability.

DESCRIPTION OF THE PRIOR ART

It has long been known to treat siliceous formations with mixed acid systems containing hydrofluoric acid (HF) to increase formation permeability, particularly with hydrochloric acid/hydrofluoric acid (HCl/HF) systems known in the art as mud acids. A common problem encountered with mud acid treatments is that precipitates are formed which, unless removed, can decrease formation permeability by blocking the pore interstices. The problem is recognized to be particularly acute in the case of siliceous formations which contain calcareous materials since the mud acid tends to react preferentially with the calcareous material and an insoluble precipitate, calcium fluoride ($CaF_2$), is formed.

Kingston et al, in U.S. Pat. No. 2,663,689 issued Dec. 22, 1952, discuss recognized mud acid precipitation problems and teach use of a buffered mud acid system comprising a solution of HCl, to which is added ammonium bifluoride ($NH_4HF_2$) to form hydrofluoric acid, and additionally containing a specified amount of boric acid or water soluble boric acid salt as buffer to avoid, or at least minimize, $CaF_2$ precipitation. Kingston et al clearly contemplated only the use of an HCl based system in that they state in Column 3, lines 1/2 "Other acids have been tried and found unsatisfactory".

Bond et al, in U.S. Pat. No. 2,652,360 issued Sept. 15, 1953, teach use of siliceous formation acidizing systems having "a concentration of hydrogen fluoride between about 5 and 25 moles per liter along with from 2.5 to 4.2 moles per liter of a halogenated organic acid" (Column 2, lines 38 to 41). To illustrate the effectiveness of such systems, Table I (Column 5) compares the silica dissolving rate of various acid systems including a series of mixed acid systems having a molarity in hydrofluoric acid of 13.5 together with respective molarities in orthophosphoric acid ($H_3PO_4$) of 1.7; 3.3; 5.0; 6.7; 8.3 and 10.

Bond, in U.S. Pat. No. 2,664,398 issued Dec. 29, 1953, teaches improved acidizing solutions, relative to what he refers to as "so-called "mud acids"" (Column 2, lines 46(47), in the form of mono-, di- or hexa-fluophosphoric acid solutions. To illustrate the effectiveness of such solutions, Table I (Column 5) compares the results of Berea sandstone core tests employing various acid solutions including, in Run 10, a mixed acid solution having a concentration of 17.7% $H_3PO_4$ and 14.4% $NH_4F$.

It has now been found that compositions broadly comprising an aqueous solution having a phosphoric acid concentration in the range of from about 10 to about 30% by weight, to which is added a fluorine donor compound in an amount to provide a generated hydrofluoric acid concentration in the range of from about 1 to about 7% by weight, display good reactivity towards clay and silica but, quite unexpectedly, significantly retarded reactivity towards calcium carbonate.

Such compositions, which employ relative concentrations of phosphoric acid to generated hydrofluoric acid which are neither taught nor suggested by known prior art, are useful for treatment of siliceous formations and, in particular, provide an inherent safety factor for usage in siliceous formations which contain or may be expected to contact moderate amounts of calcareous materials, in particular calcium carbonate, since the significantly retarded calcium carbonate reactivity decreases the potential for formation of insoluble $CaF_2$ precipitate and/or the potential for collapse of carbonate-consolidated formation matrices.

Particularly effective compositions employ Turflo ®, the composition of which is disclosed and claimed in Young et al Canadian Pat. No. 1,099,088, issued Apr. 14, 1981, corresponding to pending U.S. application Ser. No. 97,151, filed Nov. 26, 1979, now abandoned, as the starting phosphoric acid solution to which the fluorine donor compound, preferably in the form of ammonium bifluoride ($NH_4HF_2$), is added. Turflo ® components potentiate the calcium carbonate reactivity retardation, and impart desirable additional properties to the compositions, such as clay shrinking and/or stabilizing, iron sequestering and corrosion inhibition, by way of example only.

SUMMARY OF THE INVENTION

In one broad aspect the present invention provides a composition for treatment of siliceous formations, comprising an aqueous solution having a phosphoric acid concentration in the range of from about 10 to about 30% by weight, to which is added at least one fluorine donor compound in an amount to provide a generated hydrofluoric acid concentration in the range of from about 1 to about 7% by weight.

In another broad aspect the present invention provides a method of treating a siliceous formation comprising introducing into said formation a composition comprising an aqueous solution having a phosphoric acid concentration in the range of from about 10 to about 30% by weight, to which is added at least one flourine donor compound in an amount to provide a generated hydrofluoric acid concentration in the range of from about 1 to about 7% by weight.

In a preferred aspect, the aqueous solution is an aqueous solution of Turflo ®, to which is added ammonium bifluoride in an amount to provide a generated hydrofluoric acid concentration in the range of from about 2 to about 5% by weight.

In a particularly preferred aspect, the aqueous solution is an aqueous solution of Turflo ® having a phosphoric acid concentration of about 20% by weight, to which is added ammonium bifluoride in an amount to provide a generated hydrofluoric acid concentration of about 3% by weight.

DESCRIPTION OF THE PREFERRED EMBODIMENTS

The phenomena of retarded calcium carbonate reactivity displayed by compositions of the present invention is believed to result, although the mechanism is not fully understood and hence there is no desire to be bound by theory, from some form of unexpected interaction between the phosphoric acid and the added fluorine donor compound, i.e. ammonium fluoride, ammonium bifluoride or other chemically equivalent salt.

As stated previously, preferred compositions employ a Turflo ® solution as the aqueous phosphoric acid solution to which the fluorine donor compound, preferably ammonium bifluoride, is added since Turflo ® components potentiate the calcium carbonate reactivity retardation and impart desirable additional properties to the compositions, such as clay shrinking and/or stabilizing, iron sequestering and corrosion inhibition, by way of example only.

As used herein, the trademark Turflo® refers to an acidic aqueous solution comprising phosphoric acid, a citric acid-monoethanolamine elimination reaction product, a ferrous metal corrosion inhibitor and a phosphate crystal modifying agent. Turflo® is more fully disclosed in detail and claimed in Young et al Canadian Pat. No. 1,099,088, issued Apr. 14, 1981, corresponding to pending U.S. application Ser. No. 97,151, filed Nov. 26, 1979.

In one preferred form, Turflo® is an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 450 nm, a plateau from 460 nm to 465 nm, an absorption maximum at 450 nm and extinction coefficients as follows:

$\epsilon_{475} = 0.325$ l/gm.cm $\epsilon_{462} = 0.379$ l/gm.cm $\epsilon_{450} = 0.509$ l/gm.cm, an effective amount of a ferrous metal corrosion inhibitor, and an amount of a phosphate crystal modifying agent sufficient to control crystal growth, minimize crystal agglomeration and minimize crystal adhesion to the formation.

In another preferred form, Turflo® is available as a fluid concentrate intended for aqueous dilution to yield an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near N.V. with some structure, an absorption maximum at 475 nm, a plateau from 460 nm to 465 nm, an absorption maximum at 450 nm and extinction coefficients as follows:

$\epsilon_{475} = 0.325$ l/gm.cm $\epsilon_{462} = 0.379$ l/gm.cm $\epsilon_{450} = 0.509$ l/gm.cm an effective amount of a ferrous metal corrosion inhibitor, and an amount of a phosphate crystal modifying agent sufficient to control crystal growth, minimize crystal agglomeration and minimize crystal adhesion to the formation, said concentrate comprising up to about 85 weight % phosphoric acid, sufficient of said citric acid-monoethanolamine elimination reaction product to provide upon dilution an amount of from about 0.6 to about 5 weight %, an amount of said ferrous metal corrosion inhibitor sufficient upon dilution to inhibit ferrous metal corrosion, and an amount of said crystal modifying agent sufficient upon dilution to control crystal growth, minimize crystal agglomeration and minimize crystal adhesion to the formation.

The primary constituents of the acidic aqueous Turflo® solutions are as follows:

PHOSPHORIC ACID

The phosphoric acid employed in the acidic aqueous solutions is typically a technical grade, since greater purity is not normally required. The phosphoric acid employed is conventionally a 54%, 75%, or 85% technical grade and the choice of concentration can be varied dependent upon cost or, in the case of concentrate manufacture, on the desired acid concentration of the concentrate.

CITRIC ACID-MONOETHANOLAMINE ELIMINATION REACTION PRODUCT

The citric acid-monoethanolamine elimination reaction product can be prepared according to the general teachings of Schwartz U.S. Pat. No. 3,095,379, issued June 25, 1963. The elimination reaction yields active product as of the initial exothermicity and the cessation of gas evolution merely indicates that the elimination reaction has gone to completion. For purposes of the present specification, any reference to a particular weight % of the citric acid-monoethanolamine elimination reaction product is thus intended to refer to that particular weight % of active elimination reaction product.

FERROUS METAL CORROSION INHIBITOR

Preferred corrosion inhibitors are organic passivators such as diethyl thiourea (Pennzone E®), dibutyl thiourea, O.B. Hibit®, Nambit®, NACAP®, and the like. The corrosion inhibitor can also be of the filming amine or filming amine/propargyl alcohol types but these are likely to display relatively fast inhibition breakdown at bottomhole temperatures. Dependent upon the particular corrosion inhibitor employed, the amount used is likely to vary from about 0.1 to about 1 weight %. For the preferred corrosion inhibitor, diethyl thiourea, the amount used is in the range of from about 0.1 to about 1 weight %, the preferred range being from about 0.2 to about 0.5 weight %, with the particularly preferred amount being about 0.25 weight %.

CRYSTAL MODIFYING AGENT

A crystal modifying agent is typically included in the acidic aqueous solution when it is to be used for treating a well completed in a sandstone formation having a substantial carbonate content, i.e. of about 4% or more. The crystal modifying agent should be incorporated in the acidic crystal growth, minimize crystal agglomeration and minimize crystal adhesion to the formation.

Suitable crystal modifying agents include water soluble low to medium molecular weight polyacrylate polymers such as Calnox 214® (a relatively low molecular weight polymer which inhibits carbonate and sulfate scale). While phosphonates, phosphonic acids and polyphosphonates are not in themselves effective as crystal modifying agents, approximately equal combinations of a medium molecular weight polyacrylate polymer together with a member of the group consisting of water soluble phosphonates, phosphonic acids and polyphosphonates have proven most effective. Examples of this type of crystal modifying agent are Calnox 167® (a blend of an organic phosphonate and a low molecular weight polymer), Arco Base 1220® (a neutralized blend of a phosphonic acid and an acid form of a low molecular weight polymer) and CASI 773 ® (a combination of a polymer and a phosphonate).

Dependent upon the particular crystal modifying agent employed, the amount used is likely to vary from about 0.2 weight % up to the solubility limit. For the preferred crystal modifying agent, CASI 773 ®, the amount used is in the range of about 0.2 to about 2 weight %, the preferred range being from about 0.5 to about 1 weight %, with the particularly preferred amount being about 0.8 weight %.

Other constituents of the acidic aqueous Turflo ® solutions can include:

SURFACTANT

While the citric acid-monoethanolamine elimination reaction product is a surface active agent, it is frequently desirable to include an amount of another surfactant sufficient to impart improved surface active properties. Many nonionic or anionic surfactants are useful for this purpose. A preferred surfactant is Dowfax 2A1 ® (dodecyldiphenylether disulfonic acid, sodium salt), which should be used in the range of about 0.05 to about 3 weight %, the preferred range being from about 0.2 to about 1 weight %, with the particularly preferred amount being about 0.5 weight %.

HYDROXYACETIC ACID

Hydroxyacetic acid can be included in the acidic aqueous solutions in an amount in the range of from about 0.05 to about 1.5 weight %, the preferred range being from about 0.2 to about 0.6 weight %, with the particularly preferred amount being about 0.3 weight %.

While the exact function of the hydroxyacetic acid is not known it is speculated, without wishing to be bound by theory, that the hydroxyacetic acid acts either as a coupling agent and/or enhances the polarity of the citric acid-monoethanolamine elimination reaction product and/or acts as a retardant to keep the pH of largely expended acidic aqueous solutions low enough to minimize precipitation of calcium and magnesium phosphates, carbonates and sulfates.

ACID STABLE ANTIFOAMING AGENT

It has been found that at least several acid stable antifoaming agents, including Antifoam B ® and NOSI ®, control or eliminate the foaming tendency observed in some applications requiring large volumes of the acidic aqueous solutions. The preferred acid stable antifoaming agent is NOSI ® which displays antifoaming activity at a concentration of as little as about 20 ppm, and effectively renders the acidic aqueous solutions non-foaming at a concentration of about 100 ppm.

A particularly useful and commercially available Turflo ® concentrate has the following nominal composition:

H$_3$PO$_4$: 78% by weight
  Citric acid-monoethanolamine elimination reaction product: 4.5% by weight
  Hydroxyacetic acid: 1.1% by weight
  Surfactant: 1.4% by weight
  Crystal Modifier/Sequestrant: 2.7% by weight
  Corrosion Inhibitor: 0.6% by weight
  Water: 11.7% by weight For most usages, it is recommended that the above Turflo ® concentrate be diluted with three parts water (or brine as the case may be) to one part concentrate, i.e. 3:1, to yield a solution having a nominal phosphoric acid concentration of 19.5% by weight, a concentration considered non-limitatively embraced in the present specification, for sake of convenience, by the expression "about 20% by weight".

The fluorine donor, which as stated previously is preferably ammonium bifluoride, is simply mixed with the H$_3$PO$_4$ or Turflo ® solution in an amount to provide the generated hydrofluoric acid concentration desired, a matter well within the purview of persons skilled in the art.

Calcium carbonate reactivities of H$_3$PO$_4$, a series of H$_3$PO$_4$/HF systems and comparative other acids were determined gravimetrically by static solubility tests, performed at 78° C. for 60 minutes, each employing 100.0 ml of acid and 1.0000 g of CaCO$_3$ chips (10–20 mesh). The results are set out in Table 1.

TABLE 1

| Acid | approx. pH | % CaCO$_3$ dissolved after 60 min. at 78.0° C. |
|---|---|---|
| H$_3$PO$_4$ | 0.7 | 100.00 |
| H$_3$PO$_4$/1% HF | 0.8 | 61.07 |
| H$_3$PO$_4$/2% HF | 0.9 | 10.27 |
| H$_3$PO$_4$/3% HF | 1.0 | 11.40 |
| H$_3$PO$_4$/4% HF | 1.1 | 11.60 |
| H$_3$PO$_4$/5% HF | 1.2 | 12.61 |
| H$_3$PO$_4$/6% HF | 1.3 | 17.43 |
| 15% HCL | 0.1 | 100.00 |
| 12% HCl/3% HF | 0.1 | 100.00 |
| Turflo ® | 0.7 | 100.00 |

In Table 1, H$_3$PO$_4$ refers to an aqueous solution having an acid concentration of about 19.5% by weight, while Turflo ® refers to an aqueous 3:1 dilution of the previously described Turflo ® concentrate.

It is readily apparent from Table 1 that all of the H$_3$PO$_4$/HF systems display calcium carbonate reactivity retardation, with by far the most significant retardation being displayed by the systems having an HF concentration of from about 2 to about 5% by weight.

Calcium carbonate reactivities of selected concentrations of H$_3$PO$_4$ and of Turflo ®, with varying concentrations of generated HF, were determined gravimetrically by static solubility tests, performed at 78° C. for 60 minutes, each employing 100.0 ml of acid and 1.0000 g of CaCO$_3$ chips (10–20 mesh). The results are set out in Table 2.

TABLE 2

| | % CaCO$_3$ dissolved after 60 min. at 78.0° C. | | | |
|---|---|---|---|---|
| | 10% H$_3$PO$_4$ | Turflo ® | 20% H$_3$PO$_4$ | 30% H$_3$PO$_4$ |
| 0% HF | 100.0 | 100.0 | 100.0 | — |
| ½% HF | 20.07 | — | — | — |
| 1% HF | 7.93 | 36.43 | 61.07 | — |
| 2% HF | 10.71 | 5.52 | 10.27 | 95.28 |
| 3% HF | 14.29 | 6.53 | 11.40 | 14.64 |
| 4% HF | 17.80 | 8.40 | 11.60 | 11.19 |
| 5% HF | 20.10 | 9.36 | 12.61 | 11.16 |
| 6% HF | 22.00 | 14.17 | 17.43 | 11.65 |
| 7% HF | — | — | — | 11.94 |

In Table 2, Turflo ® refers to an aqueous 3:1 dilution of the previously described Turflo ® concentrate.

It is again apparent from Table 2 that the mixed acid systems display calcium carbonate reactivity retardation, the degree of which is affected by the relative concentrations of H$_3$PO$_4$ to generated HF. Thus, in the case of the 10% H$_3$PO$_4$, maximum calcium carbonate reactivity retardation is observed when the generated HF concentration is generally in the order of about 1% by weight, whereas in the case of the 20% $H_3PO_4$, maximum calcium carbonate reactivity retardation is observed when the generated HF concentration is generally in the range of from about 2 to about 5% by weight, while in the case of the 30% $H_3PO_4$, maximum calcium carbonate reactivity retardation is observed when the generated HF concentration is more in the range of from about 4 to about 7% by weight.

It is particularly of interest to observe in the case of the Turflo® that the calcium carbonate reactivity retardation, over the generated HF concentration range of from about 2 to about 5% by weight, is clearly more pronounced than that of the 20% $H_3PO_4$, which is nominally of the same acid concentration. It can only be concluded that Turflo® components, i.e. other than the $H_3PO_4$, serve to potentiate the degree of calcium carbonate reactivity retardation.

Turflo® dilutions having $H_3PO_4$ concentrations higher or lower than that of the previously described 3:1 dilution are likewise useful in compositions according to the present invention, in which case the amount of added fluorine donor can be readily increased or decreased accordingly, as will be obvious to persons skilled in the art, to provide the most effective generated HF concentration or concentration range.

Compositions having an $H_3PO_4$ concentration outside of the range of from about 10 to about 30% by weight and a generated HF concentration outside the range of from about 1 to about 7% by weight are likely to display, to a greater or lesser extent, some of the characteristics of the compositions of the present invention, but have not been extensively tested since they involve concentrations relatively impractical for the use for which the compositions of the present invention are intended.

A composition recommended for general usage is the 3:1 aqueous dilution of the previously described Turflo® concentrate, to which is added ammonium bifluoride in an amount to provide a generated HF concentration of about 3% by weight.

The calcium carbonate reaction rates of 12% HCl/3% HF; 15% HCl; Turflo® and Turflo®/3% HF were determined statically at 22° C., 40° C. and 60° C., in each case employing 50.0 ml of acid and 0.50 g of $CaCO_3$ chips (10–20 mesh), by measuring the amount of $CO_2$ absorbed by ascarite columns and converting to % by weight of $CaCO_3$ consumed. The results are set out in Tables 3 to 5.

TABLE 3

| Time (min.) | % $CaCO_3$ consumed at 22° C. | | | |
|---|---|---|---|---|
| | 12% HCl/3% HF | 15% HCl | Turflo® | Turflo®/3% HF |
| 0.5 | 48.0 | 44.49 | — | — |
| 1.0 | 90.7 | — | — | — |
| 1.25 | — | 90.54 | — | — |
| 1.75 | 98.6 | — | — | — |
| 2.0 | — | 95.38 | 10.07 | 0.02 |
| 2.5 | 99.7 | — | — | — |
| 3.25 | 100.0 | 98.00 | — | — |
| 5.0 | | 99.89 | 42.84 | 0.08 |
| 8.0 | | 100.00 | 67.71 | — |
| 11.0 | | | 80.67 | — |
| 14.0 | | | 87.88 | — |
| 20.0 | | | 93.16 | — |
| 25.0 | | | 95.27 | — |

TABLE 3-continued

| Time (min.) | % $CaCO_3$ consumed at 22° C. | | | |
|---|---|---|---|---|
| | 12% HCl/3% HF | 15% HCl | Turflo® | Turflo®/3% HF |
| 35.0 | | | 97.78 | — |
| 45.0 | | | 100.00 | — |
| 60.0 | | | | 0.30 |

TABLE 4

| Time (min.) | % $CaCO_3$ consumed at 40° C. | | | |
|---|---|---|---|---|
| | 12% HCl/3% HF | 15% HCl | Turflo® | Turflo®/3% HF |
| 0.5 | 96.0 | 91.8 | — | — |
| 0.75 | — | — | 17.91 | — |
| 1.25 | 100.0 | 100.0 | — | — |
| 1.5 | | | 36.71 | — |
| 2.5 | | | 57.17 | 0.05 |
| 4.0 | | | 78.74 | — |
| 5.0 | | | 87.53 | 0.10 |
| 6.0 | | | 93.30 | — |
| 7.0 | | | 97.07 | — |
| 8.0 | | | 98.57 | — |
| 11.0 | | | 100.00 | — |
| 30.0 | | | | 1.00 |
| 60.0 | | | | 2.20 |

TABLE 5

| Time (min.) | % $CaCO_3$ consumed at 60° C. | | | |
|---|---|---|---|---|
| | 12% HCl/3% HF | 15% HCl | Turflo® | Turflo®/3% HF |
| 0.33 | — | — | 10.05 | — |
| 0.5 | 98.0 | 96.4 | — | — |
| 1.25 | 100.0 | 100.0 | 33.96 | — |
| 2.0 | | | 62.25 | 0.06 |
| 2.75 | | | 76.71 | — |
| 3.5 | | | 87.92 | — |
| 4.25 | | | 94.40 | — |
| 5.0 | | | 99.43 | 0.12 |
| 6.0 | | | 100.00 | — |
| 15.0 | | | | 0.94 |
| 30.0 | | | | 2.48 |
| 60.0 | | | | 5.50 |

In Tables 3 to 5, and in all subsequent Tables, Turflo® refers to an aqueous 3:1 dilution of the previously described Turflo® concentrate, while Turflo®/3% HF refers to such a 3:1 dilution to which has been added ammonium bifluoride in an amount to provide a generated hydrofluoric acid concentration of about 3% by weight.

It is readily apparent from each of Tables 3 to 5 that the Turflo®/3% HF system displays a highly retarded reaction rate compared to any of the other acid systems. Given that, at all temperatures, the 12% HCl/3% HF (i.e. conventional mud acid) displays a somewhat faster rate of reaction than the 15% HCl, it would be logical to expect that the Turflo®/3% HF would likewise display a somewhat faster rate of reaction than the Turflo®. Not only was the expectation proven incorrect, the degree of comparative retardation was astonishing.

The silica reaction rates of 12% HCl/3% HF and Turflo®/3% HF were determined statically at 21° C., 55° C. and 77° C., in each case employing 200 ml of acid and a glass slide which was weighed prior to testing and after predetermined intervals. The results are as set out in Table 6.

TABLE 6

| Acid System | Temp. (°C.) | wt. of glass slide (g) | % silica dissolved after time (hours) | | | | | | |
|---|---|---|---|---|---|---|---|---|---|
| | | | 0.5 | 1.0 | 2.0 | 3.0 | 4.0 | 5.0 | 6.0 |
| 12% HCl/3% HF | 21.0 | 4.7212 | 4.85 | 9.60 | 18.94 | 27.60 | 35.27 | 42.07 | 47.94 |
| Turflo ®/3% HF | 21.0 | 4.7234 | 3.97 | 7.85 | 15.52 | 22.62 | 29.09 | 34.92 | 40.35 |
| | | | 0.5 | 1.0 | 1.5 | 2.0 | 2.5 | 3.0 | 4.0 |
| 12% HCl/3% HF | 55.0 | 4.6862 | 15.53 | 27.56 | 37.23 | 45.44 | 52.17 | 58.02 | 67.48 |
| Turflo ®/3% HF | 55.0 | 4.7332 | 13.50 | 23.82 | 32.46 | 39.85 | 46.00 | 51.40 | 60.26 |
| | | | 0.25 | 0.5 | 0.75 | 1.0 | 1.5 | 2.0 | 3.0 |
| 12% HCl/3% HF | 77.0 | 4.7050 | 13.13 | 13.71 | 32.48 | 40.39 | 53.55 | 63.43 | 77.49 |
| Turflo ®/3% HF | 77.0 | 4.6577 | 11.55 | 20.86 | 28.70 | 35.74 | 47.31 | 56.09 | 68.36 |

It can be seen from Table 6 that both acid systems display roughly similar silica reaction rates, thereby indicating that HF reactivity towards silica is relatively independent of the associated mineral acid.

The reaction rates of 12% HCl/3% HF and Turflo ®/3% FH towards ground Berea sand (100 mesh) of the following nominal composition:

| | |
|---|---|
| Quartz | 84% |
| K-feldspar | 5% |
| Kaolinite | 4% |
| Plagioclase | 4% |
| Dolomite | 2% |
| Siderite | 1% |
| Illite | 1% |
| Chlorite | trace |
| Total | 101% | were determined statically at 21.0° C. and 54.4° C., in each case employing 100 ml of acid. The results are set out in Table 7.

TABLE 7

| Acid System | Temp. (°C.) | wt. of sample (g) | % sample dissolved after time (hours) | | | | |
|---|---|---|---|---|---|---|---|
| | | | 0.5 | 1.0 | 2.0 | 3.0 | 4.0 |
| 12% HCl/3% HF | 21.0 | 1.0000 | 12.62 | 16.02 | 20.59 | 22.49 | 25.72 |
| 12% HCl/3% HF | 54.4 | 1.0000 | 21.62 | 23.76 | 25.97 | 27.76 | 29.32 |
| Turflo ®/3% HF | 21.0 | 1.0000 | 2.57 | 5.98 | 8.20 | 10.00 | 12.90 |
| Turflo ®/3% HF | 54.4 | 1.0000 | 12.76 | 14.68 | 23.07 | 25.00 | 28.18 |

Table 7 indicates that at 21° C. the 12% HCl/3% HF dissolves over twice as much Berea sand as the Turflo ®/3% HF. The same observations were noted at 54.4° C. over the first hour of the test. From two hours until test completion at 54.4° C., approximately equivalent amounts of Berea sand were dissolved by both the 12% HCl/3% HF and the Turflo ®/3% HF systems.

Reactivities of 12% HCl/3% HF, Turflo ® and Turflo ®/3% HF towards ground Eureka (Kentucky) cores of the following nominal compositions:

| | Core #10 | Core #16 | Core #22 | Core #24 |
|---|---|---|---|---|
| Quartz | 74 | 53 | 73 | 75 |
| Dolomite | 20 | 46 | 26 | 22 |
| Kaolinite | 2 | trace | 1 | 1 |
| K-feldspar | 3 | 1 | — | 1 |
| Plagioclase | trace | — | — | — |
| TOTAL | 99 | 100 | 100 | 99 | were determined statically, in each case employing 100 ml of acid and 1.0000 g of ground core. The results are set out in Table 8.

TABLE 8

| Acid System | Temp. (°C.) | % Sample Dissolved after 60 minutes | | | |
|---|---|---|---|---|---|
| | | Core #10 | Core #16 | Core #22 | Core #24 |
| 12% HCl/3% HF | 65.0 | 19.48 | 41.19 | 21.65 | 19.36 |
| Turflo ® | 65.0 | 16.51 | 38.18 | 18.85 | 17.47 |
| Turflo ®/3% HF | 65.0 | 10.30 | 17.23 | 11.28 | 12.65 |

Table 8 displays a strong correlation between sample weight loss and initial Dolomite concentration of each core for the 12% HCl/3% HF, an only slightly reduced correlation in the case of the Turflo ® and, comparatively, a significantly retarded reactivity in the case of the Turflo ®/3% HF.

Turflo ®/3% HF, in coupon tests, displayed the following corrosion rates, all of which are considered acceptable by current industry standards.

TABLE 9

| Temp. (°F.) | Type of Steel | Corrosion Rate (lb/sq.ft/hr) | Remarks |
|---|---|---|---|
| 0 | 1020 mild | 0.0005 | 3 day test no pitting |
| 250 | N-80 | 0.0178 | 8 hour test no pitting |
| 350 | N-80 | 0.0368 | 4 hour test no pitting |

In treating formations with compositions of the present invention it may be desirable dependent upon the formation, as will be appreciated by those skilled in the art, to preflush and/or afterflush the formation with fluorine-free acid or salt solutions. For example, a preflush with one or more conventional acidizing fluids such as an HCl or Turflo ® solution can be employed to dissolve CaCO3 from the formation in a radial zone about the wellbore to promote even better subsequent penetration into the formation of the compositions of the present invention. Afterflushing with acidizing fluids can also be employed for example to remove soluble precipitates from the formation and/or to dissolve unreacted calcium carbonate. Fluorine-free salt solutions can be used as a preflush to shrink and/or stabilize clays or to displace connate water containing cations which can form insoluble precipitates in association with anionic products of the subsequent reaction of the formation with the compositions of the present invention. Other conventional treatment procedures, both in terms of methodology and treating agents, useful in association with the compositions of the present invention are well within the purview of persons skilled in the art.

The following example is representative of field use of a composition of the present invention:

EXAMPLE 1

Well/Formation Data

Location—Lake Maracaibo—Venezuela (Western)
Formation—Rio Negro
Depth—17,000'
Permeability—7 mD
Porosity—13%
Clay—8% (All four clays present) chlorite 56% of 8%, No Montmorillonite
Perforated Interval—18' Net
Gravity of Crude—28° A.P.I.
B.H.T.—305° F.
B.H.P.—9500 psi.

The well was treated on July 7, 1981 as follows:

1. Pump 10 Bbl Gas oil
2. Pump 2600 U.S. Gal. Turflo ® (preflush)
3. Pump 3600 U.S. Gal. Turflo ®/3% HF
4. Pump 1800 U.S. Gal. Turflo ® (afterflush)
5. Pump 205 Bbl Gas Oil Pump time approximately 7 hours at 6000 psi 6. Shut well in approximately 2 hours - (I.S.I.P. - 4500 psi)
7. Break Out - Dowell Schlumberger
8. Rig up flow lines to production Barge
9. Two hour shut-in - (3500 psi)

The Turflo ® employed in the preflush and afterflush was prepared at the Dowell Schlumberger docks in Los Morochas by diluting the previously described Turflo ® concentrate 3:1 with fresh water and additionally including 0.75% by weight demulsifier (Dowell ® W-43) and 1% inhibitor (Dowell ® A200). The Turflo ®/3% HF was prepared on site on the barge by mixing ammonium bifluoride with the already prepared 3:1 Turflo ® approximately two hours before pumping it into the well.

Production Data

The well, prior to treatment, was producing approximately 250 B.O.P.D. Subsequent to treatment the well initially commenced producing approximately 750 B.O.P.D. and, by July 12, 1981, was producing approximately 1350 B.O.P.D.

Once the production barge was loaded the well was shut-in for lack of additional storage facilities. $H_2S$ gas will be flared and burned. It is contemplated that the entire field will be similarly treated upon completion of a pipeline to shore.

Other formations expected to respond well to treatment with compositions according to the present invention include:

U.S.A.

Muddy sandstone, Powder River Basin (includes 5–30% kaolinite, 5–10% illite, 5% montmorillonite, 5–15% chlorite) Sand Hemlock, Subclarksville, Tuscaloosa; and

Canada

Viking, Belly River, Bluesky, Basil Quartz (include 0–20% calcareous materials, 0–5% iron, 5–15% montmorillonite, 5–10% kaolinite and illite).

The use of Turflo ® as the starting phosphoric acid solution to which the fluorine donor is added is recommended, both for convenience and efficiency, since Turflo ® is a readily available commercial formulation, rapidly gaining industry acceptance, having an additive package which, as stated previously, potentiates calcium carbonate reactivity retardation while concurrently imparting desirable additional properties such as clay shrinking and/or stabilizing, iron sequestering and corrosion inhibition.

If Turflo ® is not employed in the preparation of compositions according to the present invention, i.e. a solution of a technical grade of $H_3PO_4$ is employed for example as the starting solution to which the fluorine donor is added, it will be apparent to those skilled in the art that at least some conventional additives must normally be included to ensure that such compositions display characteristics satisfying minimum field use requirements. Thus, by way of simplistic example, it will be obvious to persons skilled in the art to include an appropriate amount of one or more ferrous metal corrosion inhibitors to maintain acid degradation of casings, pumping equipment, storage vessels, etc., at acceptably low levels. Likewise the inclusion, as desired, of surfactants, sequestrants and a host of other conventional additives will also be obvious to those skilled in the art, and the inclusion of any such additives is a matter strictly ancillary to the basic inventive concept flowing from the discovery of the retarded calcium carbonate reactivity displayed by the specified novel $H_3PO_4$/HF systems.

Other variations and modifications falling within the true broad spirit and scope of the invention will be obvious to persons skilled in the art.

I claim:

1. A composition for treatment of siliceous formations, comprising an aqueous solution having a phosphoric acid concentration in the range of from about 10 to about 30% by weight, to which is added at least one flourine donor compound in an amount to provide a generated hydrofluoric acid concentration in the range of from about 1 to about 7% by weight.

2. A composition according to claim 1, wherein the fluorine donor is selected from the group consisting of ammonium fluoride and ammonium bifluoride.

3. A composition according to claim 2, wherein the fluorine donor is ammonium bifluoride.

4. A composition according to claim 1, 2 or 3, wherein the phosphoric acid concentration is about 10% by weight and wherein the fluorine donor is added in an amount to provide a generated hydrofluoric acid concentration in the range of from about 1 to about 2% by weight.

5. A composition according to claim 1, 2 or 3, wherein the phosphoric acid concentration is about 20% by weight and wherein the fluorine donor is added in an amount to provide a generated hydrofluoric acid concentration in the range of from about 2 to about 5% by weight.

6. A composition according to claim 1, 2 or 3, wherein the phosphoric acid concentration is about 30% by weight and wherein the fluorine donor is added in an amount to provide a generated hydrofluoric acid concentration in the range of from about 3 to about 7% by weight.

7. A composition according to claim 1, 2 or 3, wherein the aqueous solution is an aqueous solution having from about 10 to about 30 weight % phosphoric acid, from about 0.6 to about 5 weight % of a highly polar surface active agent which is a citric acid-monoe-thanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm $\epsilon_{462} = 0.379$ l/gm.cm $\epsilon_{450} = 0.509$ l/gm.cm, an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phsophonic acid or a phosphonate.

8. A composition according to claim 1, 2 or 3, wherein the aqueous solution is an aqueous solution having from about 10 to about 30 weight % phosphoric acid, from about 0.6 to about 5 weight % of a highly polar surface active agent which is a citric acid-monoe-thanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm $\epsilon_{462} = 0.379$ l/gm.cm $\epsilon_{450} = 0.509$ l/gm.cm, an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate, and wherein the fluorine donor is added in an amount to provide a generated hydrofluoric acid concentration in the range of from about 2 to about 5% by weight.

9. A composition according to claim 1, 2 or 3, wherein the aqueous solution is an aqueous solution having a phosphoric acid concentration of about 20% by weight, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm $\epsilon_{462} = 0.379$ l/gm.cm $\epsilon_{450} = 0.509$ l/gm.cm, an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate.

10. A composition according to claim 1, 2 or 3, wherein the aqueous solution is an aqueous solution having a phosphoric acid concentration of about 20% by weight, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm $\epsilon_{462} = 0.379$ l/gm.cm $\epsilon_{450} = 0.509$ l/gm.cm, an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate, and wherein the fluorine donor is added in an amount to provide a generated hydrofluoric acid concentration in the range of from about 2 to about 5% by weight.

11. A composition according to claim 1, 2 or 3, wherein the aqueous solution is an aqueous solution having about 20 weight % phosphoric acid, about 1.1 weight % of a highly polar surface active agent which is a citric acid-monomethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm $\epsilon_{462} = 0.379$ l/gm.cm $\epsilon_{450} = 0.509$ l/gm.cm, an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate, and wherein the fluorine donor is added in an amount to provide a generated hydrofluoric acid concentration in the range of about 3% by weight.

12. A method of treating a siliceous formation containing a calcareous component comprising introducing into said formation a composition comprising an aqueous solution having a phosphoric acid concentration in the range of from about 10 to about 30% by weight, to which is added at least one fluorine donor compound in an amount to provide a generated hydrofluoric acid concentration in the range of from about 1 to about 7% by weight.

13. A method according to claim 12, wherein in the composition the added fluorine donor is selected from the group consisting of ammonium fluoride and ammonium bifluoride.

14. A method according to claim 13, wherein in the composition the added fluorine donor is ammonium bifluoride.

15. A method according to claim 12, 13 or 14, wherein in the composition the phosphoric acid concentration is about 10% by weight and the fluorine donor is added in an amount to provide a generated hydrofluoric acid concentration in the range of from about 1 to about 2% by weight.

16. A method according to claim 12, 13 or 14, wherein in the composition the phosphoric acid concentration is about 20% by weight and the fluorine donor is added in an amount to provide a generated hydrofluoric acid concentration in the range of from about 2 to about 5% by weight.

17. A method according to claim 12, 13 or 14, wherein in the composition the phosphoric acid concentration is about 30% by weight and the fluorine donor is added in an amount to provide a generated hydrofluoric acid concentration in the range of from about 3 to about 7% by weight.

18. A method according to claim 12, 13 or 14, wherein in the composition the aqueous solution is an aqueous solution having from about 10 to about 30 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$$\epsilon_{475} = 0.325 \ \text{l/gm.cm}$$

$$\epsilon_{462} = 0.379 \ \text{l/gm.cm}$$

$$\epsilon_{450} = 0.509 \ \text{l/gm.cm,}$$

an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate.

19. A method according to claim 12, 13 or 14, wherein in the composition the aqueous solution is an aqueous solution having from about 10 to about 30 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$$\epsilon_{475} = 0.325 \ \text{l/gm.cm}$$

$$\epsilon_{462} = 0.379 \ \text{l/gm.cm}$$

$$\epsilon_{450} = 0.509 \ \text{l/gm.cm,}$$

an effective amount of a ferrous metal corrosion inhibitor, and an amount of crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate, and the fluorine donor is added in an amount to provide a generated hydrofluoric acid concentration in the range of from 2 to about 5% by weight.

20. A method according to claim 12, 13 or 14, wherein in the composition the aqueous solution is an aqueous solution having a phosphoric acid concentration of about 20% by weight, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$$\epsilon_{475} = 0.325 \ \text{l/gm.cm}$$

$$\epsilon_{462} = 0.379 \ \text{l/gm.cm}$$

$$\epsilon_{450} = 0.509 \ \text{l/gm.cm,}$$

an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate.

21. A method according to claim 12, 13 or 14, wherein in the composition the aqueous solution is an aqueous solution having a phosphoric acid concentration of about 20% by weight, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$$\epsilon_{475} = 0.325 \ \text{l/gm.cm}$$

$$\epsilon_{462} = 0.379 \ \text{l/gm.cm}$$

$$\epsilon_{450} = 0.509 \ \text{l/gm.cm,}$$

an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate, and the fluorine donor is added in an amount to provide a generated hydrofluoric acid concentration in the range of from about 2 to about 5% by weight.

22. A method according to claim 12, 13 or 14, wherein in the composition the aqueous solution is an aqueous solution having about 20 weight % phosphoric acid, about 1.1 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$$\epsilon_{475} = 0.325 \text{ l/gm.cm}$$

$$\epsilon_{462} = 0.379 \text{ l/gm.cm}$$

$$\epsilon_{450} = 0.509 \text{ l/gm.cm,}$$

an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate, and the fluorine donor is added in an amount to provide a generated hydrofluoric acid concentration in the range of about 3% by weight.

23. A method according to claim 12, 13 or 14, including the additional step of preflushing the formation with fluorine-free acid or salt solution.

24. A method according to claim 12, 13 or 14, including the additional step of afterflushing the formation with fluorine-free acid or salt solution.

25. A method according to claim 12, 13 or 14, including the additional steps of preflushing and afterflushing the formation with fluorine-free acid or salt solution.

26. A method according to claim 14, wherein in the composition the aqueous solution is an aqueous solution having a phosphoric acid concentration of about 20% by weight, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$$\epsilon_{475} = 0.325 \text{ l/gm.cm}$$

$$\epsilon_{462} = 0.379 \text{ l/gm.cm}$$

$$\epsilon_{450} = 0.509 \text{ l/gm.cm,}$$

an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate, and the ammonium bifluoride is added in an amount to provide a generated hydrofluoric acid concentration in the range of from about 2 to about 5% by weight and including at least one additional step selected from the group consisting of preflushing and afterflushing the formation with fluorine-free acid or salt solution.

27. A method according to claim 26, wherein in the composition the ammonium bifluoride is added in an amount to provide a generated hydrofluoric acid concentration to about 3% by weight.

28. A method according to claim 26 or 27, wherein the additional step comprises preflushing the formation with at least one acid solution selected from the group consisting of a hydrochloric acid solution, and a solution being an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$$\epsilon_{475} = 0.325 \text{ l/gm.cm}$$

$$\epsilon_{462} = 0.379 \text{ l/gm.cm}$$

$$\epsilon_{450} = 0.509 \text{ l/gm.cm,}$$

an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate.

29. A method according to claim 26 or 27, wherein the additional step comprises afterflushing the formation with at least one acid solution selected from the group consisting of a hydrochloric acid solution, and a solution being an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$$\epsilon_{475} = 0.325 \text{ l/gm.cm}$$

$$\epsilon_{462} = 0.379 \text{ l/gm.cm}$$

$$\epsilon_{450} = 0.509 \text{ l/gm.cm,}$$

an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate.

30. A method according to claim 26 or 27, including the additional steps of both preflushing and afterflushing the formation with at least one acid solution selected from the group consisting of a hydrochloric acid solution, and a being an acidic aqueous solution comprising from about 5 to about 36 weight % phosphoric acid, from about 0.6 to about 5 weight % of a highly polar surface active agent which is a citric acid-monoethanolamine elimination reaction product characterized by a visible absorption spectrum which displays an increasing extinction coefficient from the red to the near U.V. with some structure, an absorption maximum at 475 nm, a plateau from 460 nm to 465 nm, an absorption maximum at 450 nm and extinction coefficients as follows:

$\epsilon_{475} = 0.325$ l/gm.cm $\epsilon_{462} = 0.379$ l/gm.cm $\epsilon_{450} = 0.509$ l/gm.cm, an effective amount of a ferrous metal corrosion inhibitor, and an amount of a crystal modifying agent sufficient to control crystal growth, minimize crystal agglomeration and minimize crystal adhesion to the formation, said crystal modifying agent being selected from the group consisting of polyacrylate polymers and blends of such polymers with phosphonic acid or a phosphonate.

31. A method according to claim 26 or 27, wherein the additional step comprises preflushing the formation with a fluorine-free clay stabilizing salt solution.

32. A method according to claim 26 or 27, wherein the additional step comprises preflushing the formation with a fluorine-free salt solution to displace connate water containing cations which can form insoluble precipitates in association with anionic products of the reaction between the hydrofluoric acid and the formation.

* * * * *